United States Patent
Teng et al.

(10) Patent No.: US 6,337,302 B1
(45) Date of Patent: Jan. 8, 2002

(54) METHOD FOR PRODUCING ACTIVATED CARBON FROM CARBON BLACK

(76) Inventors: Chien-Lang Teng, No.119, Hsiu Chi Hsiang, Chang Ping Road, Sec.2; Feng-Sung Wang, No.421, Chung Mei Street, both of Taichung (TW)

(*) Notice: Subject to any disclaimer, the term of this patent is extended or adjusted under 35 U.S.C. 154(b) by 60 days.

(21) Appl. No.: 09/580,120

(22) Filed: May 30, 2000

(51) Int. Cl.⁷ ............................................. C01B 31/10
(52) U.S. Cl. ................... 502/432; 423/445 R; 502/416; 502/433
(58) Field of Search ................... 502/416, 430, 502/431, 432, 433; 423/445 R, 460

(56) References Cited

U.S. PATENT DOCUMENTS

| | | | |
|---|---|---|---|
| 5,326,791 A | 7/1994 | Saleh et al. | 521/45 |
| 5,976,484 A | 11/1999 | Teng et al. | 423/449.7 |

FOREIGN PATENT DOCUMENTS

| | | |
|---|---|---|
| JP | 51-18577 | 2/1976 |
| JP | 58-25384 | 2/1983 |
| TW | 162283 | 7/1991 |
| TW | 221705 | 3/1994 |

*Primary Examiner*—Stuart L. Hendrickson
(74) *Attorney, Agent, or Firm*—Burns, Doane, Swecker & Mathis, L.L.P.

(57) ABSTRACT

Purified carbon black carried by a screw conveyer, while being subject to preheating treatment, is transported to a microwave heating zone where it is heated to a temperature between 250° C. and 400° C. and subsequently, it is sent into a flow-type steam activation furnace there under the passage of steam and at a temperature inside the furnace maintained at 700° C. to 900° C. the carbon black is heated and activated to form a powdery activated carbon. This novel method for the production of activated carbon with high added value from carbon black is a continuous process of high productivity especially suitable for carbon black recovered from the heating and splitting decomposition processes of waste tires, waste plastics and the like. It is also suitable for carbon black as an industrial solid waste discharged from combustion electric power plant or from any industrial furnace that makes use of heavy oil, coal or natural gas for fuel; therefore the invention is a success not only with regard to recovery of resources but also regarding to environmental issues such as waste disposal and pollution.

5 Claims, 3 Drawing Sheets

METHOD FOR PRODUCING ACTIVATED CARBON FROM CARBON BLACK

BACKGROUND OF THE INVENTION

This invention in general relates to the production of activated carbon. Particularly, this invention relates to a method for producing activated carbon with a high-added value from industrial waste carbon black such as that produced from waste-tire recycling industry or combustion electric power plant.

In recent years the already huge and ever growing number of waste tires and waste plastics has become an urgent and worldwide environmental pollution problem, probably next in importance only to the disposal of radioactive wastes. Presently in waste-rubber/waste-plastic recycling industry the usual practice is to have the wastes pulverized and then thrown into a sealed heat splitting decomposition furnace where at high temperature the pulverized wastes are decomposed and separated into fuel oil, fuel gas, carbonized substance and other residues like steel wire and so on. Special methods and techniques for this purpose have been disclosed in Japan Patent No. 51-18577 and No. 58-25384, U.S. Pat. No. 5,326,791, as well as Taiwan Patent No. 162283 and No. 221705. The fuel oil and fuel gas so produced are readily useful. As to the carbonized substance this solid matter may be pulverized and ground into carbon black powders or granulates for reuse in tire, rubber, or ink industry. Be that as it may, attention needs be drawn to the fact that nowadays the supply of carbon black has already exceeded the need, and due to the inferior quality of such carbon black recovered from waste tires and waste plastics there is practically no place for it in the market. Besides, more and more carbon black are daily coming out from combustion electric power plants and from all sorts of industrial furnaces that consume heavy oil, coal or natural gas, it is obvious that carbon black is more a threat to our environment than an inexpensive raw material for particular industries. To this problem a promising solution is to render such virtually useless carbon black into activated carbon which is an industrial commodity with high added value. At present, the activated carbon sold in the market, whether in the form of powder or granulate, is produced from carbonation and then activation of waste wood pieces, saw dusts, coconut shells, or all kinds of natural coal; to our knowledge, nothing of it comes from industrial waste carbon black. In a previous disclosure (U.S. Pat. No. 05,976,484) the inventors have presented a method as well as a device for recovering refined activated carbon from waste tires and the like: the present disclosure is a follow-up of their effort on the same topic.

SUMMARY OF THE INVENTION

A major object of this invention is to provide a method for producing activated carbon from carbon black, wherein industrial waste carbon black after preheating and steam activation processes is turned into activated carbon with a high-added value.

A further object of this invention is to provide a method for producing activated carbon from carbon black, wherein purified carbon black powder is subject to preheating and microwave heating, and then is delivered into a high-temperature activation furnace where it is activated under steam and carbon dioxide or nitrogen to form activated carbon.

A still further object of this invention is to-provide a method for producing activated carbon from carbon black, whereby the activation process is accomplished within a short time in a continuous working manner with the advantage of high productivity and low cost.

BRIEF DESCRIPTION OF THE DRAWINGS

The foregoing and other objectives, features and advantages of the invention will be apparent from the following more particular description of a preferred embodiment of the invention, as illustrated in the accompanying drawings, of which

DETAILED DESCRIPTION OF THE INVENTION

Figure 1:
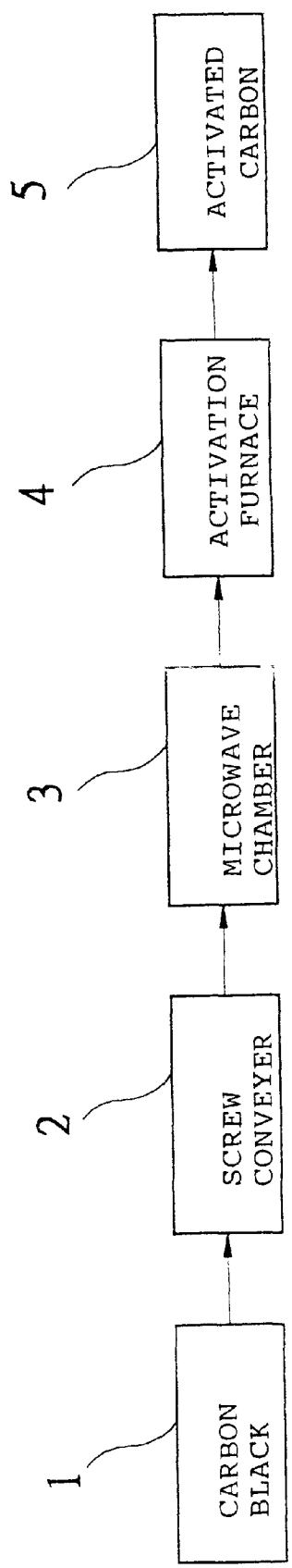
FIG. 1 is a flowchart showing five major steps of a complete activation process according to the invention.

To begin with, this invention includes five major procedures as shown in FIG. 1. Here 1 denotes carbon black, which has been purified by acid and alkaline washing treatments, and which initially may be either a common industrial waste produced from thermal decomposition of waste plastics and waste rubbers, or that discharged out of such industrial furnaces that consume heavy oil, natural gas, coal, etc., like the kind used in a combustion electric power plant. 2 denotes a screw conveyer that operates inside a preheating chamber where carbon black is subject to electric heating and is gradually heated up from room temperature to 150° C. and above. 3 denotes a microwave chamber, which may be also regarded as the first activation chamber, where water is led in and is subject to microwave heating to generate steam, and the preheated carbon black is over here heated up from 150° C. to about 400° C. Subsequently, carbon black is fed into the mouth of a flow-type steam activation furnace, denoted by 4. Steam and air are separately led into the activation furnace, and furnace temperature is maintained within the range from 700° C. to 1000° C. Carbon black is thus activated to become activated carbon, denoted by 5, as the final product.

Figure 2:
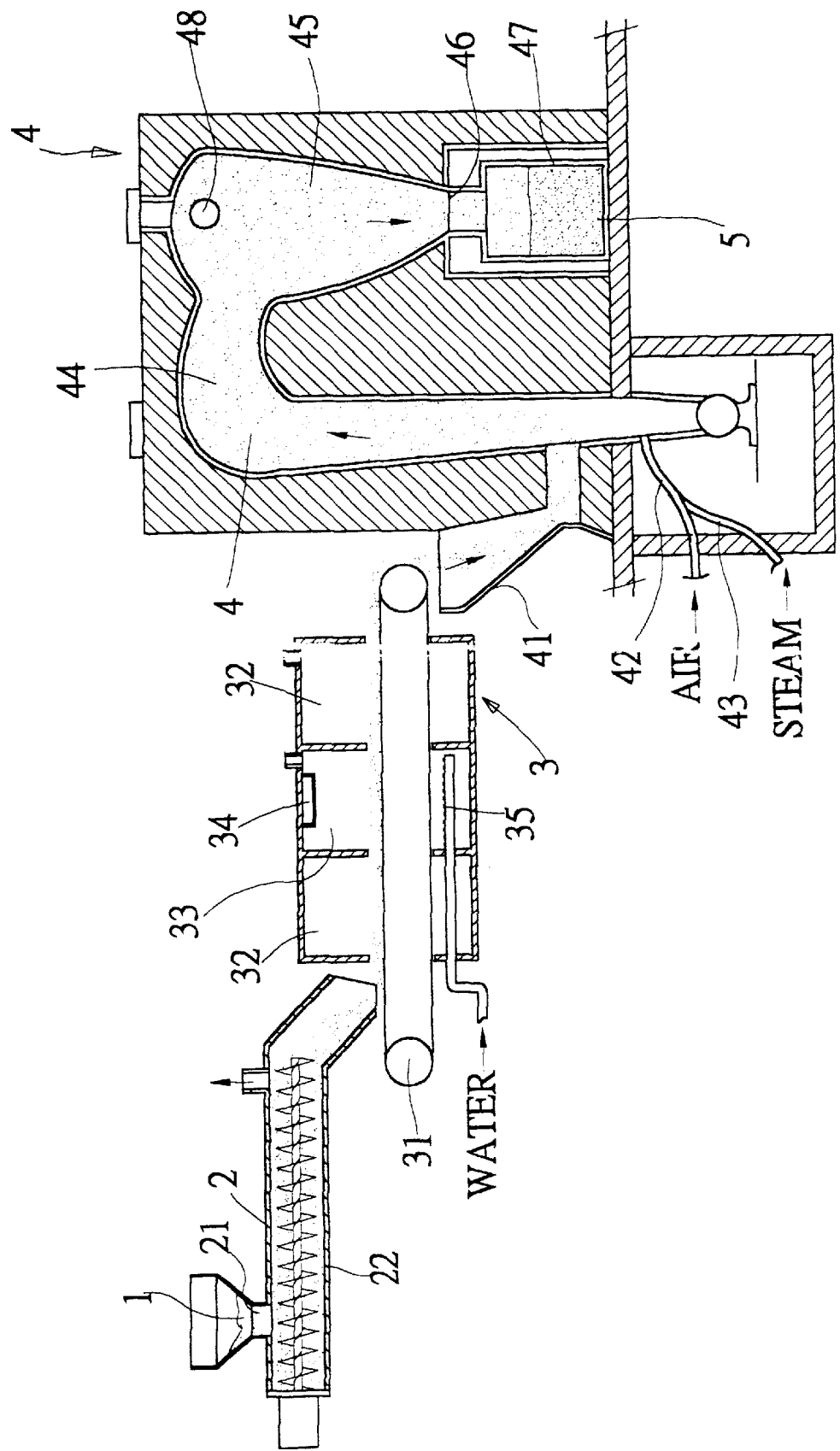
FIG. 2 is a graphical representation of one preferred embodiment of the invention.

More substantially, the forgoing may be better understood with a description of FIG. 2 as follows. Powdery carbon black 1 through feed tank or throw-in port 21 is sent onto screw conveyer 2. Said screw conveyer operates inside a tunnel-like preheating chamber. The inner wall of said preheating chamber is so designed that it functions like a giant electric heater 22 which section by section gradually warms up carbon black from room temperature up to a certain temperature between 150° C. and 200° C., while carbon black travels screw-wise through the preheating chamber. At the outlet of the preheating chamber preheated carbon black is discharged onto conveyer belting 31 and is transported into microwave chamber 3. Said microwave chamber is divided into three compartments like sandwich, the middle one is microwave main chamber 33, and the other two are microwave shield chambers 32. The microwave main chamber is installed with a microwave generator 34 at top and a steam generator 35 at bottom that respectively generate microwave and steam to further heat up and in practice partly activate the preheated carbon black. The steam generator is actually a network of water pipe with many openings facing up; as soon as water is led in through the pipe it is immediately vaporized and turned into as many steam jets by microwave heating which maintains the microwave chamber at 200 to 400° C. Then, at the end of conveyer belting carbon black is dropped into another feed tank 41 which is the entrance of a vertical flow-type steam activation furnace 4. For effective activation the temperature inside the furnace must be maintained at 700° C. at least, preferably between 800° C. and 900° C., and this is preferably done via electric heating. There are a steam inlet 42 and an air inlet 43 through which steam and air are separately led in from the bottom of the furnace. The steam to air ratio may be from 1:1 to 3:1. At such conditions carbon black is properly activated and becomes airborne activated carbon powder in an airflow that is formed of a mixture of steam and air. Said airflow directs the activated carbon powder through conduct pipe 44 to activated carbon collecting chamber 45 in which there is a turbine separator to separate activated carbon powder from waste gases. Through the collecting chamber's bottom outlet 46 activated carbon powder is then discharged and gathered in a collecting barrel 47. Waste gases in the furnace are expelled out through an air outlet 48 located near the top of the collecting chamber.

The air that led into the activation furnace may be replaced by nitrogen or carbon dioxide for better activation efficiency and result; yet this is costly, without giving much improvement to the quality of activated carbon, and therefore is not advisable.

Figure 3:
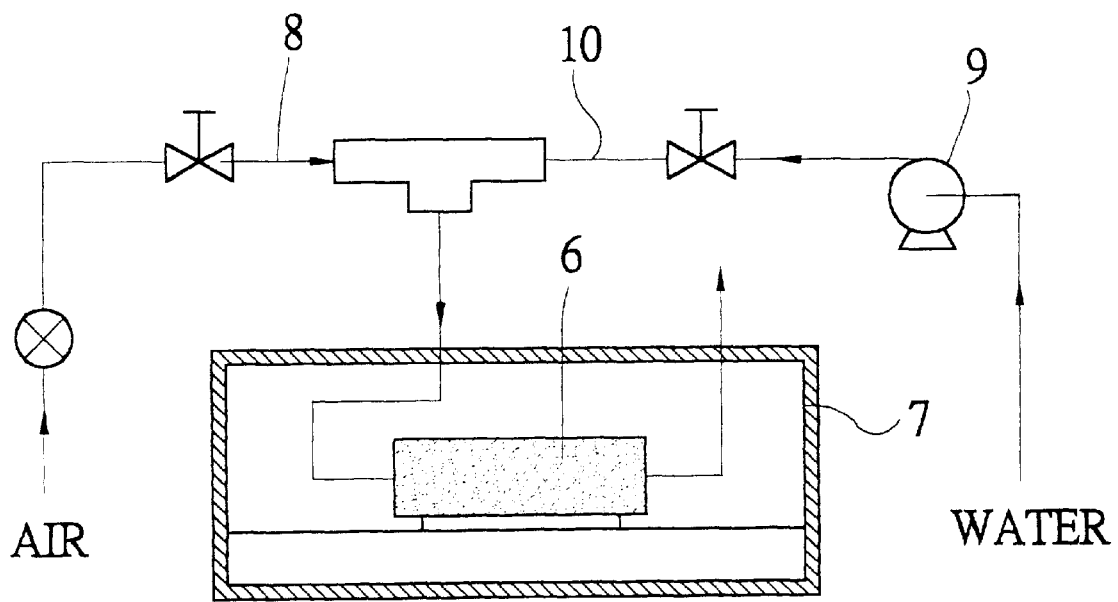
FIG. 3 is a schematic diagram of a laboratory apparatus for carbon black activation experiment.

With reference to FIG. 3 a carbon black activation experiment along with specific laboratory data is here described for further illustration of the invention. Briefly the experimental procedures are the following:

(1) Prepare 30 grams dry carbon black powder of 100 to 200 mesh, place the sample in an open container and preheat this to about 150° C.

(2) Place a cup of water in a microwave oven and start the oven till the water turns boiling and the oven is full of steam.

(3) Put the preheated carbon black sample into the steam-full microwave oven and start the oven till about 400° C.

(4) Put the microwave-heated carbon black sample into a cylindrical activation containers 6 and place this in a high-temperature furnace 7.

(5) Lead in air at flow rate 30~50 ml/min through air tube 8, meanwhile increase furnace temperature to above 500° C.

(6) Start water pump 9 to have water led into the furnace through water tube 10 at flow rate 25~35 ml/min, so that steam is quickly built up inside the furnace.

(7) At forgoing conditions keep raising furnace temperature till the targeted activation temperature and activation time.

(8) Stop water supply and turn off furnace heat input.

(9) Keep airflow going for cleaning and cooling purposes, till the furnace is cooled down to room temperature.

(10) Take out the activated carbon from the cylindrical activation container and run a few standard quality tests with the same.

Results of such experiment run at activation temperatures 700° C., 800° C. and 900° C., in comparison with the quality of a certain commercial activated carbon, are listed in Table 1.

TABLE 1

| activation temperature (° C.) | 700 | 800 | 900 | commercial granulate activated carbon produced from coconut shells |
|---|---|---|---|---|
| recovery rate (%) | 91.3 | 88.5 | 85.1 | — |
| adsorptive capacity methylbenzene g/g activated carbon | 31.6 | 38.8 | 45.2 | 31.5 |
| BET surface area ($m^2/g$) | 671.5 | 692.2 | 875.3 | 665.6 |
| single-point surface area ($m^2/g$) | 690.1 | 701.5 | 894.4 | 689.2 |

In Table 1, one can see that the quality, in terms of adsorptive capacity for instance, of the activated carbon produced according to the present invention is in no way inferior to the commercially available product like the kind produced from the carbonization of coconut shells. Here again the inventors see fit to emphasize that this novel method for activated carbon production is a continuous process of high productivity, as the whole activation process takes generally from 10 to 20 minutes only, depending on furnace temperature and the desired quality of the final product. It may be well also to emphasize that the foregoing embodiment and experiment of the invention, including the specific procedures, conditions and results herein substantially described, only partly indicate the application range of the invention: they do not represent the full scope of the same and can not be regarded as limits to the same; and it will be understood by those who are skilled in the art-that other changes can be made therein without departing from the spirit and scope of the invention.

Description of Reference Numerals 1 carbon black
2 screw conveyer
3 microwave chamber
4 flow-type high-temperature activation furnace
5 activated carbon
6 cylindrical activation container
7 high-temperature furnace
8 air tube
9 water pump
10 water tube
21 feed tank or throw-in port
22 electric heater
23 preheating chamber outlet
31 conveyer belt
32 microwave shield chamber
33 microwave main chamber
34 microwave generator
35 steam generator
41 feed tank or throw-in port
42 steam inlet
43 air inlet
44 conduct pipe
45 activated carbon collecting chamber
46 activated carbon collecting chamber bottom outlet
47 activated carbon collecting barrel
48 waste gases outlet

What is claimed is:

1. A method for producing activated carbon from carbon black, comprising conducting the powdery carbon black into a high temperature activation furnace where surrounded by steam it is activated to obtain a powdery activated carbon; characterized in that:

the carbon black while being subject to pre-heating by a screw conveyer having a stepwise control of temperature on the outer barrel is transported into the interior of a microwave chamber where it is heated by microwave to a temperature between 250° C. and 400° C., and subsequently the carbon black is thrown into a flow-type steam activation furnace and activated at an atmosphere of steam and at a high temperature of 700° C. to 900° C. to produce a powdery activated carbon.

2. The method for producing activated carbon from carbon black according to claim 1, wherein the temperature inside the barrel of said screw conveyer increases gradually from the throw-in port of feed stock to the discharge port from room temperature to a temperature about 150° C. to 200° C.

3. The method for producing activated carbon from carbon black according to claim 1, wherein the microwave chamber is provided on the inside bottom thereof with a conveyer belting with one end receiving feed stock discharged by the screw conveyer and the other end throwing the feed stock heated by microwave into the throw-in port of the steam activation furnace, said feed stock being heated during moving of the conveyer.

4. The method for producing activated carbon from carbon black according to claim 3, wherein the microwave chamber is provided on the bottom thereof with a steam generator and on the front and the rear respectively with a microwave shield chamber.

5. The method for producing activated carbon from carbon black according to claim 1, wherein the steam activation furnace is of a vertical type, the bottom of which is provided with a steam and an air inlets and on the upper portion of which is located a conduit passing into a whirlwind separate type activated carbon collecting chamber; the carbon black that enter the furnace and are activated to become the product of activated carbon being collected by a collecting barrel at the bottom of the collecting chamber and the waste gases being discharged out from an outlet on the upper portion of the collecting chamber.

* * * * *